United States Patent
Tanaka et al.

(10) Patent No.: US 6,931,937 B1
(45) Date of Patent: Aug. 23, 2005

(54) PRESSURE SENSOR HAVING DIAPHRAGM

(75) Inventors: Hiroaki Tanaka, Kariya (JP); Inao Toyoda, Anjo (JP); Yasutoshi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/019,286

(22) Filed: Dec. 23, 2004

(30) Foreign Application Priority Data

Feb. 3, 2004 (JP) .............................. 2004-026953

(51) Int. Cl.[7] .............................................. G01L 9/00
(52) U.S. Cl. .......................................... 73/753; 73/754
(58) Field of Search .......................... 73/700, 753–756, 73/335.02; 34/163

(56) References Cited

U.S. PATENT DOCUMENTS

| 5,349,873 A | 9/1994 | Omura et al. |
| 5,507,186 A | 4/1996 | Weiblen et al. |

*Primary Examiner*—Harshad Patel
*Assistant Examiner*—Alandra Ellington
(74) *Attorney, Agent, or Firm*—Posz Law Group, PLC

(57) ABSTRACT

A pressure sensor includes: a casing; a sensor chip with a gauge resistor; a boss disposed on the gauge resistor; a metallic diaphragm capable of distorting in accordance with a pressure; and a load transmission member disposed between the metallic diaphragm and the boss. The casing accommodates the sensor chip, the boss and the load transmission member. The casing is covered with the metallic diaphragm. The pressure applied to the diaphragm is detected such that the load corresponding to the pressure is applied to the gauge resistor through the metallic diaphragm, the load transmission member and the boss so that the pressure is measured on the basis of a resistance change of the gauge resistor. The gauge resistor is larger than the boss.

9 Claims, 8 Drawing Sheets

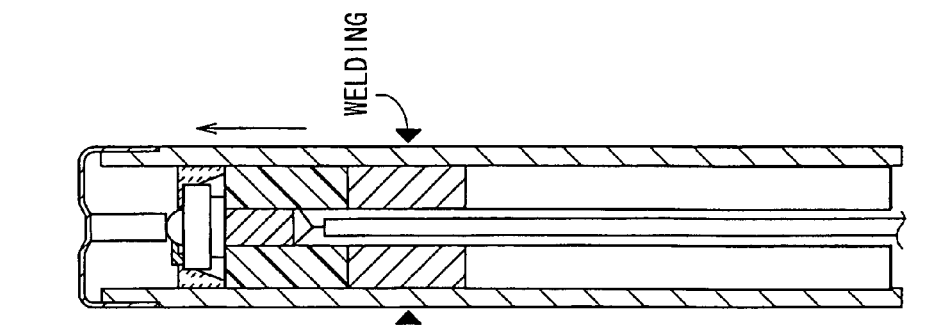
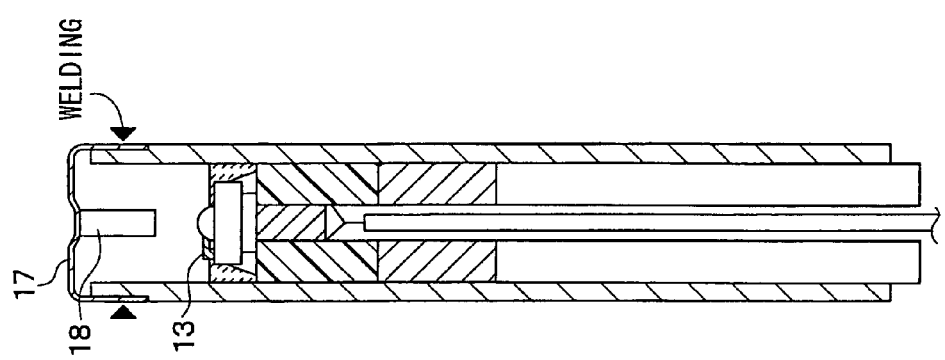
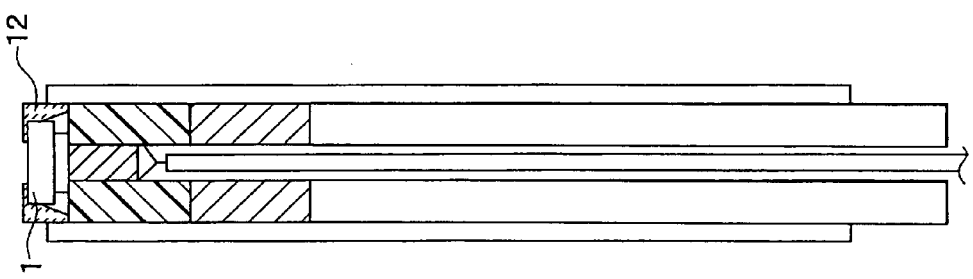
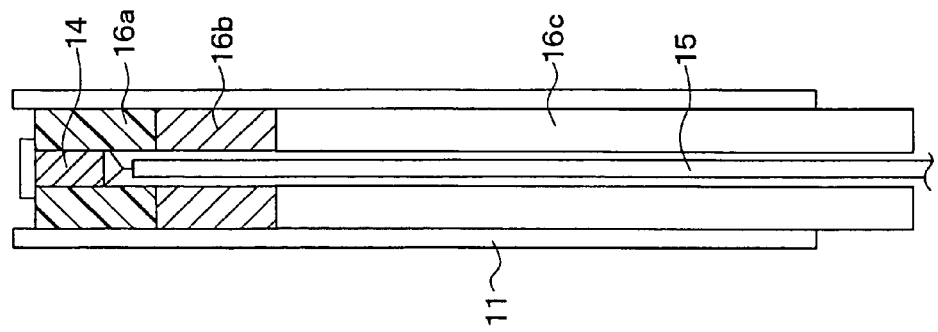

PRESSURE SENSOR HAVING DIAPHRAGM

CROSS REFERENCE TO RELATED APPLICATION

This application is based on Japanese Patent Application No. 2004-26953 filed on Feb. 3, 2004, the disclosure of which is incorporated herein by reference.

FIELD OF THE INVENTION

The present invention relates to a pressure sensor having a diaphragm.

BACKGROUND OF THE INVENTION

A pressure sensor detects pressure on the basis of a resistance change of a gauge resistor in accordance with a load, which is directly transmitted to the gauge resistor. Here, the pressure as a measurement object distorts a diaphragm, and then, the distortion of the diaphragm is directly transmitted to the gauge resistor as the load through a load transmission member. This type pressure sensor is disclosed in, for example, U.S. Pat. No. 5,349,873.

In the above sensor, when the load applied to the sensor is relatively small, the resistance change is small. Therefore, in this small load region, the sensor shows a small sensitivity so that the sensor does not detect the pressure precisely. Further, the characteristic curve of the sensor, which shows a relationship between the load and the resistance change, is not straight so that the curve does not have sufficient linearity. Furthermore, the curve may have a hysteresis loop. Thus, the pressure sensor does not have sufficient sensitivity and detection accuracy.

SUMMARY OF THE INVENTION

In view of the above-described problem, it is an object of the present invention to provide a pressure sensor with a diaphragm having high sensitivity, high linearity and small hysteresis.

A pressure sensor includes: a casing having an inner through hole with an opening; a sensor chip with a gauge resistor disposed on a surface of the sensor chip; a boss disposed on the gauge resistor; a metallic diaphragm capable of distorting in accordance with a pressure; and a load transmission member disposed between the metallic diaphragm and the boss and being movable in accordance with a distortion of the metallic diaphragm so that a load corresponding to the pressure applied to the metallic diaphragm is transmitted to the boss through the load transmission member. The casing accommodates the sensor chip, the boss and the load transmission member inside the inner through hole of the casing. The opening of the casing is covered with the metallic diaphragm. The pressure applied to the diaphragm is detected in such a manner that the load corresponding to the pressure is applied to the gauge resistor through the metallic diaphragm, the load transmission member and the boss so that a resistance of the gauge resistor is changed, and that the pressure is measured on the basis of a resistance change of the gauge resistor. The gauge resistor is larger than the boss, seeing from a load transmission member side, so that the boss is covered with the gauge resistor.

In the above sensor, the gauge resistor is larger than the boss from the top view of the boss and the gauge resistor so that the boss is covered with the gauge resistor. Therefore, the portion, at which the stress is concentrated to become maximum, is overlapped with the gauge resistor so that the maximum stress near the outer circumference of the boss is applied to the gauge resistor completely. Accordingly, the characteristics of the relationship between the load and the resistance change of the gauge resistor have excellent linearity, and further, the sensitivity of the sensor shows no fluctuation substantially so that the gauge resistor can detect the small load even when the small load is applied to the sensor. Furthermore, the hysteresis of the sensor characteristics becomes much smaller. Thus, the above sensor has high sensitivity, high linearity and small hysteresis.

Preferably, the boss has a circular cross section perpendicular to a center axis of the casing. The gauge resistor has a square cross section perpendicular to the center axis of the casing. The boss has a diameter equal to or slightly smaller than a dimension of a side of the gauge resistor.

Further, a pressure sensor includes: a cylindrical member; a sensor chip with a gauge resistor disposed inside the cylindrical member; a boss disposed on the gauge resistor and disposed inside the cylindrical member; a metallic diaphragm capable of distorting in accordance with a pressure; and a load transmission member disposed between the metallic diaphragm and the boss so that the diaphragm is disposed on the sensor chip through the load transmission member and the boss, and being movable in accordance with a distortion of the metallic diaphragm so that a load corresponding to the pressure applied to the metallic diaphragm is transmitted to the boss through the load transmission member. The pressure applied to the diaphragm is detected in such a manner that the load corresponding to the pressure is applied to the gauge resistor so that a resistance of the gauge resistor is changed, and that the pressure is measured on the basis of a resistance change of the gauge resistor. The gauge resistor has a cross section larger than that of the boss, the cross section perpendicular to a center axis of the cylindrical member.

In the above sensor, the gauge resistor is larger than the boss so that the maximum stress near the outer circumference of the boss is applied to the gauge resistor completely. Accordingly, the characteristics of the relationship between the load and the resistance change of the gauge resistor have excellent linearity and sensitivity without hysteresis. Thus, the above sensor has high sensitivity, high linearity and small hysteresis.

BRIEF DESCRIPTION OF THE DRAWINGS

The above and other objects, features and advantages of the present invention will become more apparent from the following detailed description made with reference to the accompanying drawings. In the drawings:

FIGS. 7A to 7D are cross sectional views explaining a method for manufacturing the pressure sensor according to the preferred embodiment;

DETAILED DESCRIPTION OF THE PREFERRED EMBODIMENT

Figure 11:
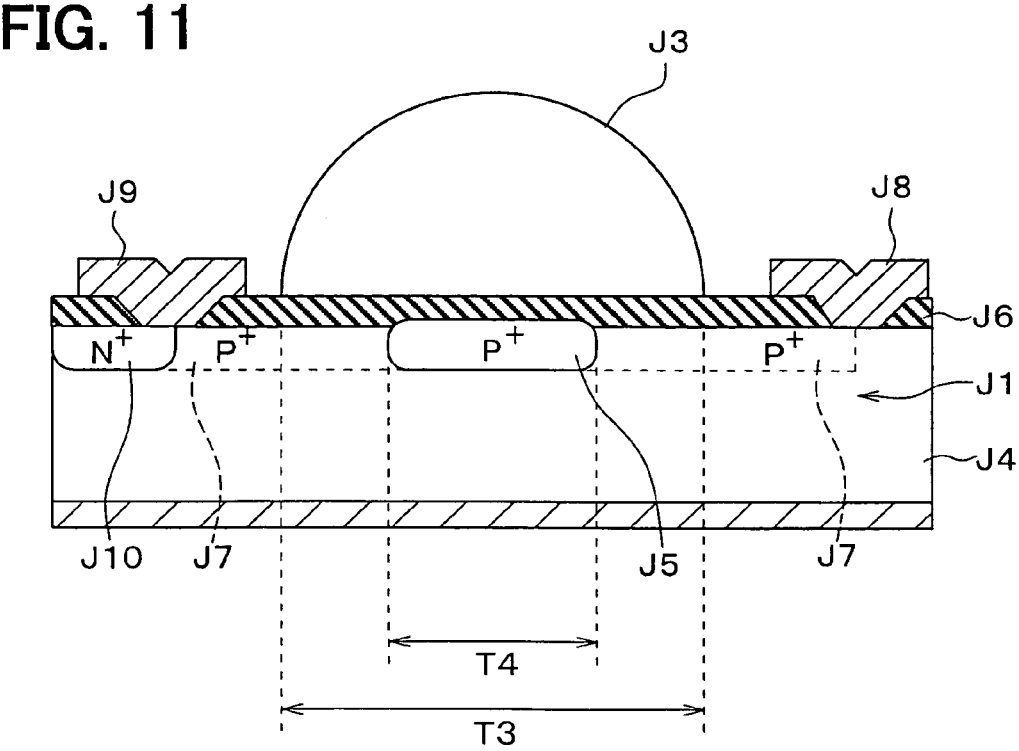
FIG. 11 is a partially enlarged cross sectional view showing a main part of a pressure sensor according to a comparison of the preferred embodiment.

The inventors have preliminarily studied about a pressure sensor for detecting pressure on the basis of a resistance change of a gauge resistance in accordance with a mechanical load corresponding to the pressure as a measurement object. The sensor is shown in FIG. 11. The sensor includes a sensor chip J1, and a hemispherical member J3, which is disposed on the sensor chip J1.

The sensor chip J1 has an N conductive type silicon substrate J4 as a base, a gauge resistor J5, an insulation film J6, a P+ conductive type contact portion J7, a pair of electrodes J8, J9, an N+ conductive type layer J10 and a backside electrode J11. The gauge resistor J5 is formed on a surface of the substrate J4. The insulation film J6 is disposed on the surface of the gauge resistor J5. The contact portion J7 protrudes from the gauge resistor J5 in the silicon substrate J4. The backside electrode J11 is disposed on the backside of the substrate J4.

The hemispherical member J3 is composed of a hemisphere surface and a disk planer surface. A load in accordance with pressure as a measurement object applied to the sensor is applied to the hemispherical surface; and then, the disk planer surface presses the gauge resistor J5. Thus, the load corresponding to the pressure is applied to the gauge resistor J5. The gauge resistor J5 is covered with the hemispherical member J3 completely. Specifically, a dimension of the hemispherical member J3 is defined as T3, which is a diameter of the hemispherical member J3. The dimension T3 is longer than a dimension T4 of the gauge resistor J5, which is a length of the gauge resistor J5.

This type pressure sensor works as follows. A voltage of a power source is applied to the backside electrode J11, and the electrode J9 side is grounded. Thus, the current flows through the backside electrode J11, the substrate J4, the electrode J8, the contact portion J7, the gauge resistor J5, the N+ conductive type layer J10 and the electrode J9, in this order. The current varies in accordance with the resistance change of the gauge resistor J5, since the resistance of the gauge resistor J5 changes in accordance with the load corresponding to the pressure applied to the hemispherical member J3.

Therefore, the current is measured as a pressure detection current by a detector (not shown) so that the sensor can detect the pressure. Here, although the current also flows through the backside electrode J11, the substrate J4 and the electrode J9, this current does not contribute to the pressure detection. This is because the current flowing through the above path is determined by an inner resistance of the substrate J4 so that the current is determined unambiguously.

Figure 12:
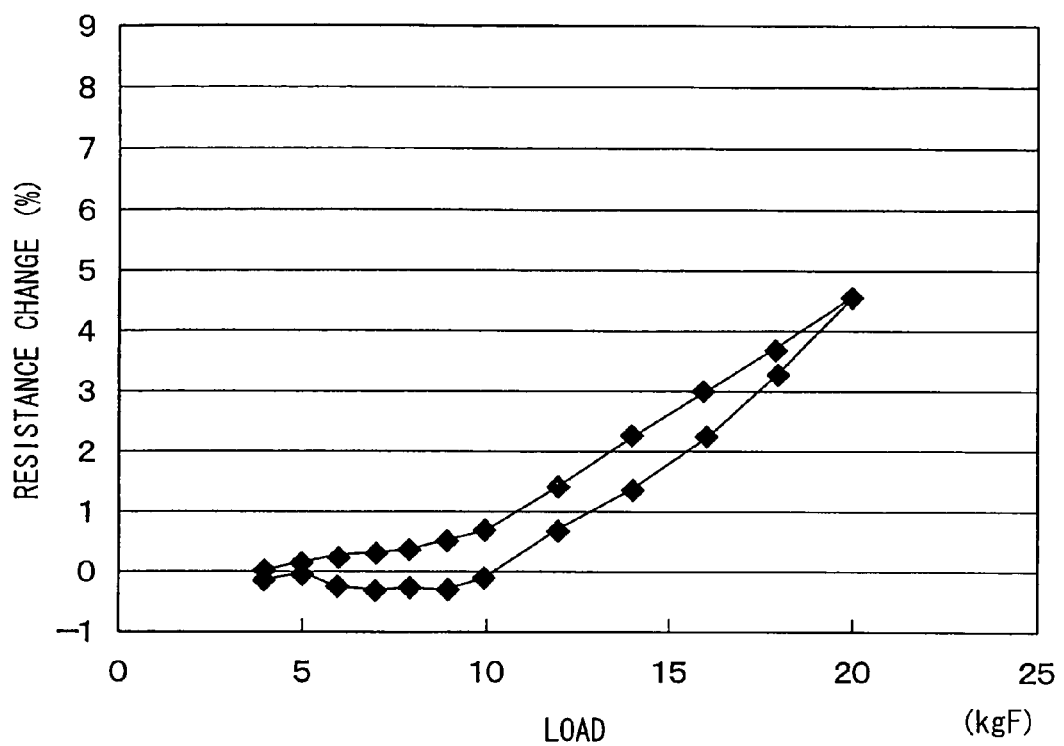
FIG. 12 is a graph showing a relationship between a load and a resistance change of a gauge resistor in the pressure sensor according to the comparison of the preferred embodiment.

The characteristics of the above sensor are tested. When the load is applied to the gauge resistor J5 through the hemispherical member J3, the resistance change of the gauge resistor J5 in accordance with the load is measured, as shown in FIG. 12. When the load is relatively small, the resistance change is small. Therefore, in this small load region, the sensor shows a small sensitivity so that the sensor does not detect the pressure precisely. Further, the characteristic curve of the sensor is not straight so that the curve does not have sufficient linearity. Furthermore, the curve has a hysteresis.

In view of the above problems, a pressure sensor according to a preferred embodiment of the present invention is provided. This type pressure sensor is suitably used for an automotive vehicle. Specifically, the sensor is disposed on a top of a cylinder in an engine of the vehicle so that the sensor detects pressure of fuel vapor in the cylinder near a top end of a piston in the cylinder.

Figure 1:
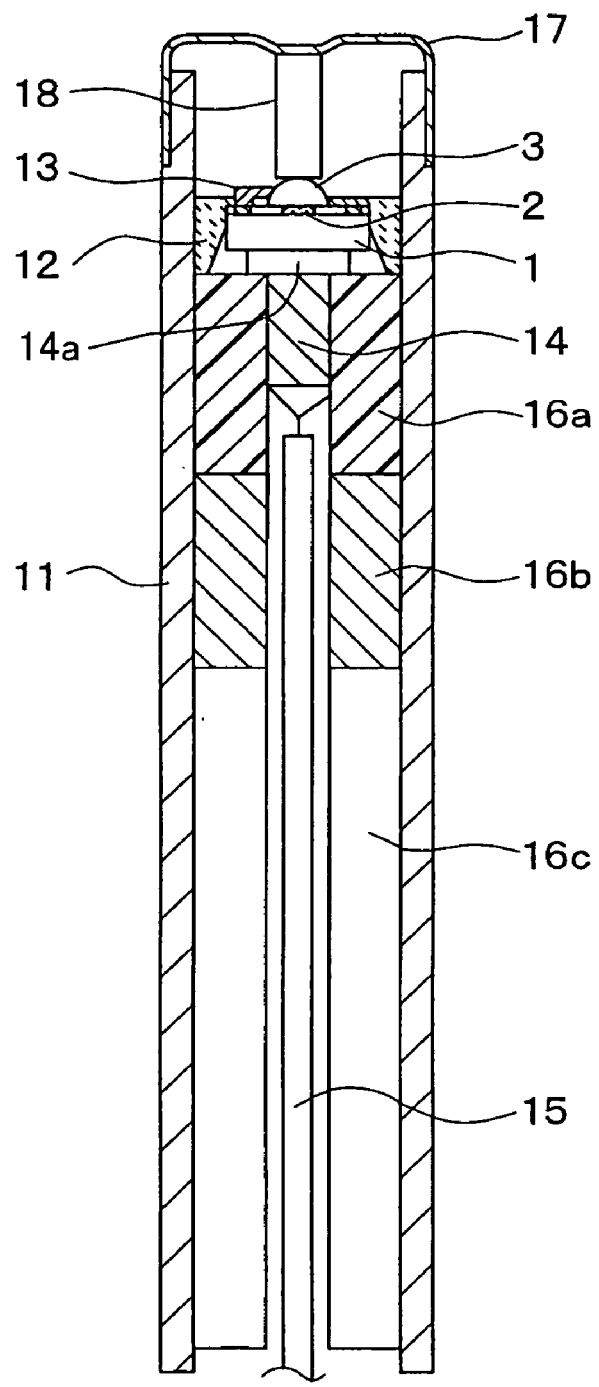
FIG. 1 is a cross sectional view showing a pressure sensor according to a preferred embodiment of the present invention.
Figure 2:
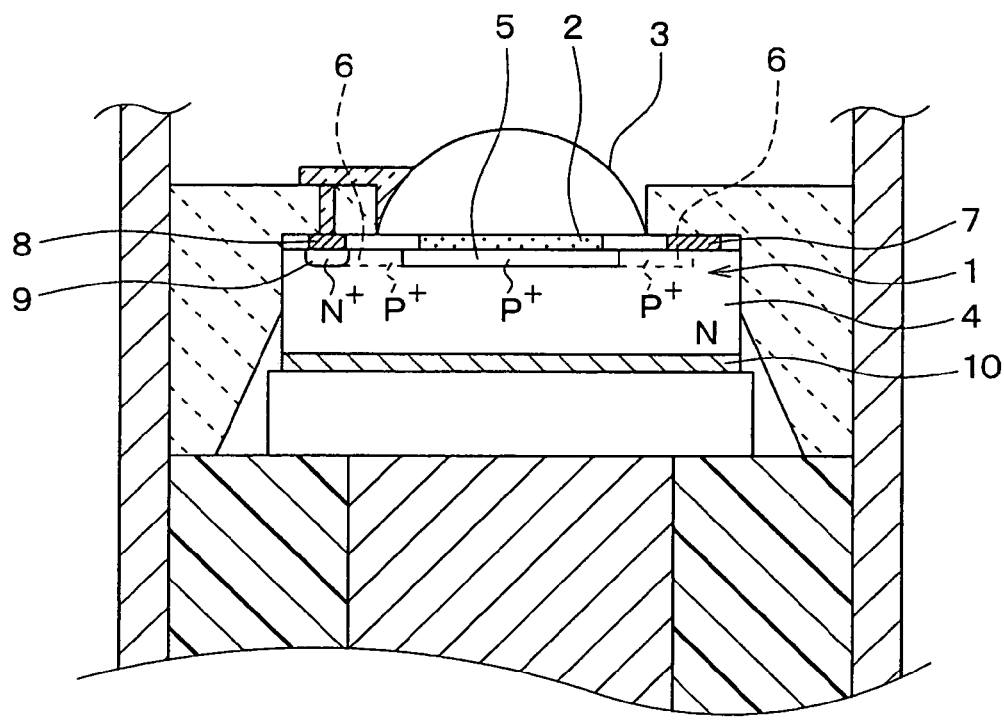
FIG. 2 is a partially enlarged cross sectional view showing a main part of the sensor according to the preferred embodiment.

The sensor is shown in FIGS. 1 and 2. The sensor includes a sensor chip 1, a boss 2 and a hemispherical member 3. The boss 2 is formed on the sensor chip 1. The hemispherical member 3 presses the boss 2 so that a load is applied to the hemispherical member 3.

Figure 3A:
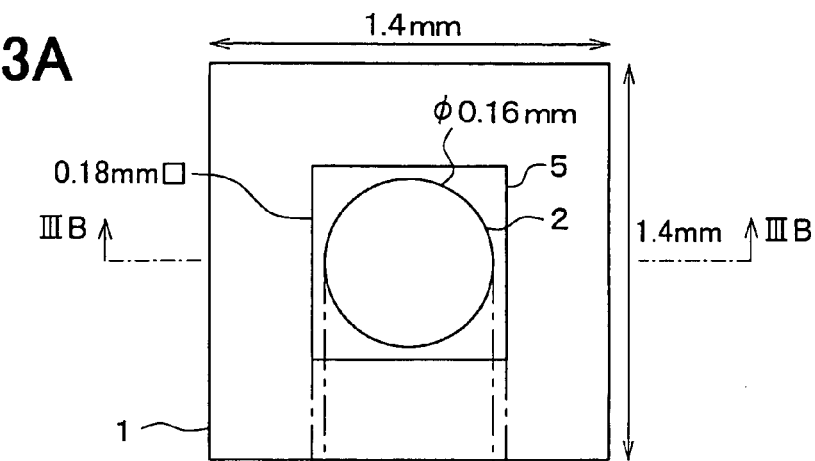
FIG. 3A is a plan view showing a sensor chip of the pressure sensor.
Figure 3B:
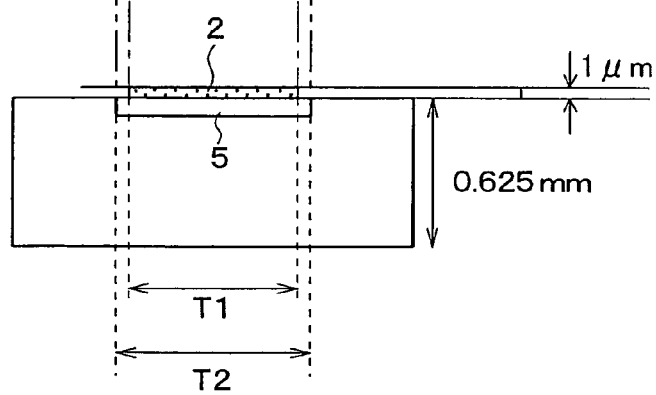
FIG. 3B is a cross sectional view showing the sensor chip taken along line IIIB—IIIB in FIG. 3A, according to the preferred embodiment.

The sensor chip 1 is formed of an N conductive type silicon substrate 4 as a base. The substrate 4 has a thickness of 0.625 mm, and each side of the substrate 4 is 1.4 mm, as shown in FIGS. 3A and 3B. The sensor chip 1 includes a gauge resistor 5, a P+ conductive type contact portion 6, a pair of electrodes 7, 8, an N+ conductive type layer 9 and a backside electrode 10. The gauge resistor 5 is formed on the principal surface of the substrate 4. The contact portion 6 partially protrudes from the gauge resistor 5. The backside electrode 10 is disposed on the backside of the substrate 4. The silicon substrate 4 of the sensor chip 1 is parallel to a <110> crystal axis of silicon so that an output of the gauge resistor 5 becomes larger. Therefore, the electrodes 7, 8 are disposed on both ends of the <110> crystal axis.

The boss 2 is made of brittle material. In this embodiment, the boss 2 is made of silicon nitride film (i.e., a SiN film) having a certain pattern disposed on the surface of the gauge resistor 5. The boss 2 and the gauge resistor 5 have a following relationship.

FIGS. 3A and 3B show only the sensor chip 1, specifically, the gauge resistor 5 and the boss 2. FIG. 3B is a cross sectional view showing the sensor chip 1 taken along line IIIB—IIIB so that the sensor chip 1 is cut in a certain direction (i.e., a load transmission direction).

The sensor chip 1 has a square shape seeing from a top view. Each side of the sensor chip 1 is 1.4 mm. The boss 2 and the gauge resistor 5 are overlapped each other at the center of the sensor chip 1. The boss 2 has a circular shape. The diameter of the boss 2 is, for example, φ0.16 mm. The boss 2 has a thickness of 1 μm. The gauge resistor 5 has a square shape. Each side of the gauge resistor 5 is 0.18 mm. Therefore, the length T2 of the side of the gauge resistor 5 is almost equal to or a little larger than the diameter T1 of the boss 2. Seeing from the top view, the boss 2 is completely covered with the gauge resistor 5 so that the boss 2 is disposed inside of the gauge resistor 5. The sensor has the above described relationship between the boss 2 and the gauge resistor 5.

As shown in FIG. 2, the hemispherical member 3 is composed of a hemisphere surface and a disk planer surface. A load in accordance with pressure as a measurement object applied to the sensor is transmitted to the hemispherical surface; and then, the disk planer surface presses the boss 2. The pressed boss 2 also presses the gauge resistor 5. Thus, the load corresponding to the pressure is applied to the gauge resistor 5 so that the pressure is detected.

The diameter of the hemispherical surface of the hemispherical member 3 is, for example, 1.0 mm. The hemispherical surface is coated with a conductive material such as a metal plating film. Therefore, current can flow through the hemispherical surface.

The pressure sensor further includes a cylindrical member 11, which includes a positioning member 12, a conductive adhesive 13, a support member 14, an electrical wire 15, the first to third cylindrical members 16a–16c, a metallic diaphragm 17 and a load transmission member 18.

Figure 4:
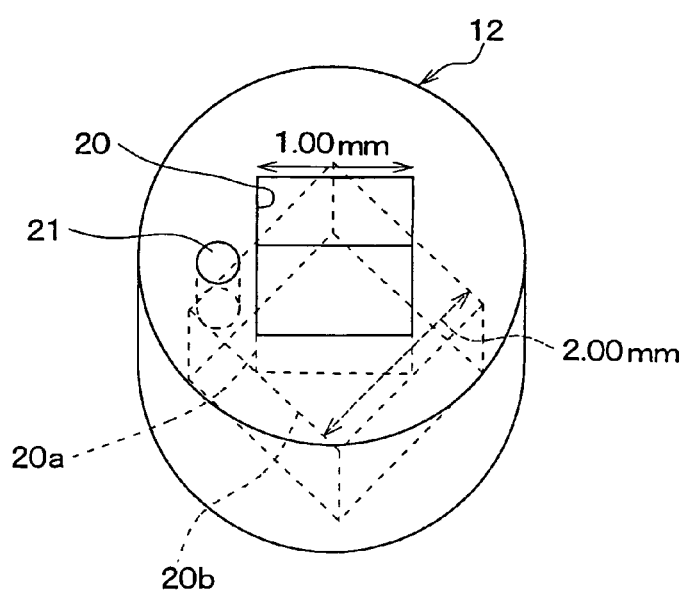
FIG. 4 is a perspective view showing a positioning member, according to the preferred embodiment.

The cylindrical member 11 provides a housing for accommodating the sensor chip 1, the boss 2 and the hemispherical member 3. The cylindrical member 11 is made of metallic material such as SUS (i.e., steel use stainless). The positioning member 12 works for positioning the sensor chip 1 in the cylindrical member 11. FIG. 4 shows the positioning member 12. The positioning member 12 has a cylindrical columnar shape, which has a diameter almost equal to an inner diameter of the cylindrical member 11. A concavity 20 is formed at the center of the positioning member 12. The concavity 20 has a step. The concavity 20 is composed of a hemispherical member accommodation portion 20a and a sensor chip accommodation portion 20b. The hemispherical member accommodation portion 20a has an upper surface having a square planer surface with 1.0 mm square area. The sensor chip accommodation portion 20b has a lower surface having a square planer surface with 2.0 mm square area. The hemispherical member accommodation portion 20a and the sensor chip accommodation portion 20b are skewed by 45 degree each other so that they provide the step of the concavity 20. Specifically, one side of the hemispherical member accommodation portion 20a is tilted from one side of the sensor chip accommodation portion 20b by 45°.

The positioning member 12 further includes a through hole 21, which is disposed near one side of the square planer surface of the hemispherical member accommodation portion 20a. The through hole 21 connects between the upper surface of the hemispherical member accommodation portion 20a and the sensor chip accommodation portion 20b. The through hole 21 for wiring is used for electrically connecting to the sensor chip 1. The through hole 21 has a predetermined diameter.

To form the through hole 21 having the predetermined diameter, it is required that a part of the sensor chip accommodation portion 20b, which is protruded from the hemispherical member accommodation portion 20a, i.e., which is not overlapped with the hemispherical member accommodation portion 20a, is larger than the predetermined diameter of the through hole 21. However, when the length of a side of the sensor chip accommodation portion 20b becomes merely larger than that of the hemispherical member accommodation portion 20a, the sensor chip accommodation portion 20b becomes much larger. Therefore, in this embodiment, the hemispherical member accommodation portion 20a and the sensor chip accommodation portion 20b are skewed by 45 degree each other so that the through hole 21 having the predetermined diameter is formed appropriately, and that the dimensions of the sensor chip accommodation portion 20b are minimized. Thus, the sensor chip 1 is also minimized appropriately.

The positioning member 12 is accommodated in the cylindrical member 11 so that the center axis of the concavity 20 of the cylindrical member 11 coincides with the center axis of both of the hemispherical member accommodation portion 20a and the sensor chip accommodation portion 20b of the positioning member 12. Thus, the center axis of the positioning member 12 is apart from the inner wall of the cylindrical member 11 by a predetermined distance.

The sensor chip 1 is accommodated in the sensor chip accommodation portion 20b of the positioning member 12. Further, the hemispherical member 3 is accommodated in the hemispherical member accommodation portion 20a. Thus, the sensor chip 1 and the hemispherical member 3 are disposed on the center axis of the cylindrical member 11.

The conductive adhesive 13 electrically connects between the hemispherical surface of the hemispherical member 3 and the electrode 8 of the sensor chip 1 through the through hole 21 of the positioning member 12.

The support member 14 electrically connects to the backside electrode 10 of the sensor chip 1. The support member 14 is made of conductive material such as Kovar. The support member 14 has an almost cylindrical columnar shape. A flange 14a is formed on the top of the support member 14. A part of the support member except for the flange 14a is accommodated in a concavity of the first cylindrical member 16a. Thus, the sensor chip 1 is supported by the flange 14a of the support member 14. Further, the support member 14 is held by the flange 14a at a predetermined position in the first cylindrical member 16a.

The electrical wire 15 electrically connects between the sensor chip 1 and the outside surface of the cylindrical member 11. Specifically, one end of the electrical wire 15 connects to the end of the support member 14 through concavities of the first to third cylindrical members 16a–16c, and the other end of the electrical wire 15 connects to the backside electrode 10 of the sensor chip 1 through the support member 14.

Each of the first to third cylindrical members 16a–16c has a diameter almost equal to the inner diameter of the cylindrical member 11. Further, each of the first to third cylindrical members 16a–16c has the above described concavity having the same inner diameter. The first to third cylindrical members 16a–16c are concentrically disposed in the cylindrical member 11 under the positioning member 12 in this order.

The first cylindrical member 16a supports the positioning member 12. Further, the first cylindrical member 16a positions the support member 14, i.e., the first cylindrical member 16a protects the support member 14 from dropping out. The first cylindrical member 16a is made of insulation material such as ceramics or heat-resistant resin so that the first cylindrical member 16a electrically isolates between the support member 14 and the cylindrical member 11.

The second cylindrical member 16b positions and holds parts such as the first cylindrical member 16a accommodated in the cylindrical member 11. The outer surface of the second cylindrical member 16b is bonded to the inner wall of the cylindrical member 11 by a welding method. The second cylindrical member 16b is made of, for example, metallic material.

The third cylindrical member 16c works as a guide of the electrical wire 15, and is made of metallic material or resin.

The metallic diaphragm 17 is formed from a thin metallic plate. The diaphragm 17 becomes distorted by pressure as a measurement object. The diaphragm 17 has a U-shape cross section, i.e., a cup-like shape so that one end of the diaphragm 17 is opened. The top of the cylindrical member 11 is engaged in the opening of the diaphragm 17, and then, the diaphragm 17 is bonded to the cylindrical member 11 around an outer circumference of the diaphragm 17 by the welding method.

The load transmission member 18 has a cylindrical columnar shape, and is made of conductive material such as metal. One end of the load transmission member 18 connects to the bottom of the diaphragm 17 at the center of the diaphragm 17. The other end of the load transmission member 18 contacts the top of the hemispherical surface of the hemispherical member 3. Therefore, when the diaphragm 17 becomes distorted by the pressure applied to the diaphragm 17, the load transmission member 18 is shifted by the distortion of the diaphragm 17 so that the load transmission member 18 moves downward along with the center axis of the cylindrical member 11. Thus, the pressure applied to the diaphragm 17 is transmitted to the hemispherical member 3. Here, the pressure sensor is mounted on the cylindrical member 11, and the electrical wire is connected to the pressure sensor. The pressure sensor has a pressure detection portion for applying a predetermined voltage to the electrical wire 15. When the predetermined voltage is applied to the electrical wire 15, the pressure detection portion measures a current flowing through the electrical wire 15. Specifically, the operation of the pressure sensor is described as follows.

Firstly, the electrical wire 15 is connected to an electric power supply terminal of the pressure detection portion of the pressure sensor. Further, the cylindrical member is connected to a ground terminal of the pressure detection portion. Then, the predetermined voltage generated from the pressure detection portion is applied to the electrical wire 15. Thus, the current for detecting the pressure flows through the electrical wire 15, the support member 14, the sensor chip 1, the conductive adhesive 13, the hemispherical surface of the hemispherical member 3, the load transmission member 18, the metallic diaphragm 17, and the cylindrical member 11 in this order.

Before the pressure is applied to the diaphragm 17, or when the atmospheric pressure is applied to the diaphragm 17, the current for detecting the pressure becomes a predetermined value. When the pressure as the measurement object is applied to the diaphragm 17, the diaphragm 17 is distorted in accordance with the pressure so that the load transmission member 18 is displaced. Thus, the load corresponding to the pressure is applied to the hemispherical member 3.

The load applied to the hemispherical member 3 is transmitted to the boss 2, and further, the load is transmitted to the gauge resistor 5 so that the resistance of the gauge resistor 5 is changed in accordance with the load corresponding to the pressure. Accordingly, the current for detecting the pressure is changed in accordance with the resistance change, and the current is read by the pressure detection portion of the pressure sensor. Thus, the pressure is measured by the sensor.

Figure 5:
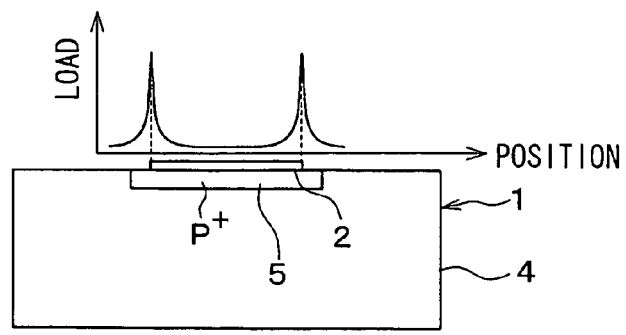
FIG. 5 is a cross sectional view explaining a load distribution on a silicon substrate, according to the preferred embodiment.

In a case where the boss 2 applies the load to the gauge resistor 5, a stress distribution on the surface of the silicon substrate 4 including the gauge resistor 5 is shown in FIG. 5. The stress is concentrated near the outer circumference of the boss 2 so that the stress becomes maximum near the outer circumference. The stress becomes smaller inside the boss 2.

In the sensor as the comparison shown in FIG. 11, the hemispherical member J3 is larger than the gauge resistor J5. Therefore, in a case where a portion, at which the stress is concentrated to become maximum, is not overlapped with the gauge resistor J5, the gauge resistor J5 changes its resistance in accordance with small stress. This is, the gauge resistor J5 detects the stress with low sensitivity. Therefore, when the load is comparatively small, the stress is not sufficiently applied to the gauge resistor J5. Thus, the resistance change of the gauge resistor J5 becomes smaller so that the sensitivity of the gauge resistor J5 is reduced. Further, the sensitivity of the gauge resistor J5 may fluctuate. Furthermore, the characteristics of the relationship between the load and the resistance change of the gauge resistor J5 deviates from the linearity. Further, the hysteresis is generated in the characteristics of the sensor.

However, in this embodiment, the gauge resistor 5 is larger than the boss from the top view of the boss 2 and the gauge resistor 5. Further, the boss 2 is covered with the gauge resistor 5. Therefore, as shown in FIG. 5, the portion, at which the stress is concentrated to become maximum, is overlapped with the gauge resistor 5 so that the maximum stress near the outer circumference of the boss 2 is applied to the gauge resistor 5 completely.

Figure 6:
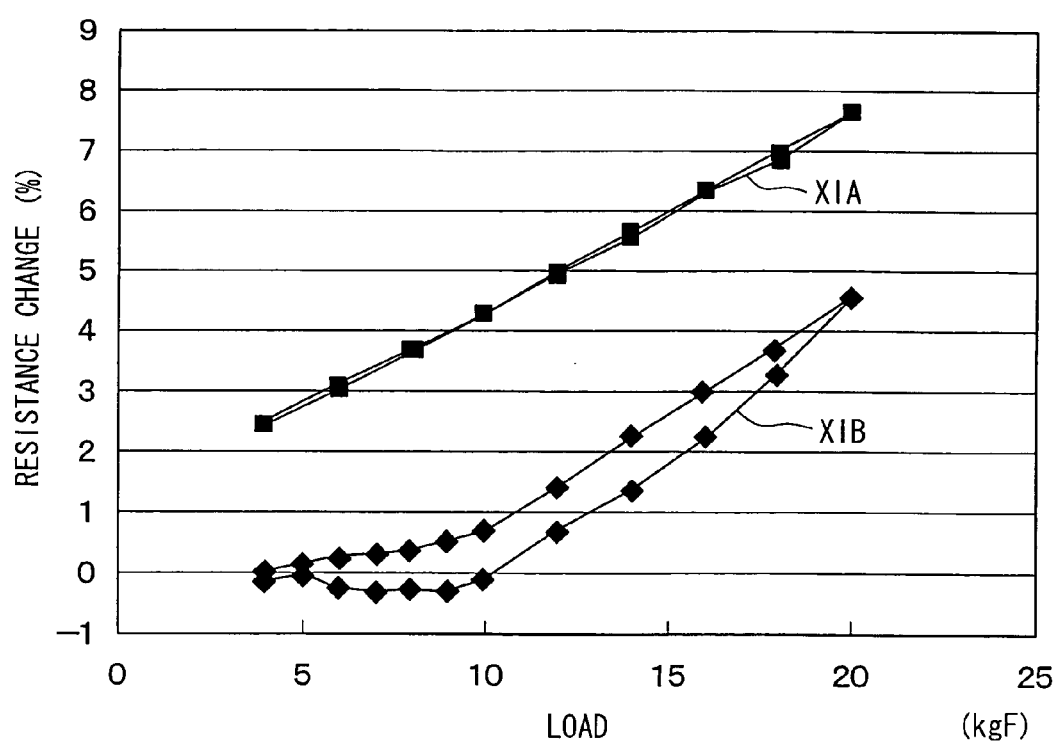
FIG. 6 is a graph showing a relationship between a load and a resistance change of a gauge resistor in the pressure sensor according to the preferred embodiment.

In the pressure sensor according to this embodiment, the characteristics of the relationship between the load and the resistance change of the gauge resistor 5 is measured and shown in FIG. 6. In FIG. 6, a curve XIA represents the sensor shown in FIG. 1 according to this embodiment, in which the boss as a stress application portion is smaller than the gauge resistor 5 as a gauge portion. A curve XIB represents the sensor as the comparison shown in FIG. 11, in which the hemispherical member J3 a stress application portion is larger than the gauge resistor J5 as a gauge portion. The characteristics of the relationship between the load and the resistance change of the gauge resistor 5 in the curve XIA have excellent linearity, and further, the sensitivity of the sensor shows no fluctuation substantially so that the gauge resistor can detect the small load even when the small load is applied to the sensor. Furthermore, the hysteresis of the sensor characteristics becomes much smaller.

Thus, since the sensor has the gauge resistor 5 larger than the boss 2, the sensitivity, the linearity and the hysteresis of the pressure sensor is improved.

Next, the method for manufacturing the pressure sensor is described as follows with reference to FIGS. 7A–7D.

Firstly, before the pressure sensor is assembled, the sensor chip 1 and the boss 2 are prepared. The sensor chip 1 is formed by a conventional semiconductor process, and the boss 2 is also formed by the conventional semiconductor process. Specifically, the P$^+$ conductive type gauge resistor 5 is formed by an ion implantation method or the like on the surface of the silicon substrate 4 provided by a silicon wafer. Further, the contact portion 6, which is protruded partially from the gauge resistor 5, is also formed by the ion implantation method or the like. The N$^+$ conductive type layer 9 is also formed by the ion implantation method or the like.

Next, a silicon nitride film is formed on the surface of the silicon substrate 4, and then, the silicon nitride film is patterned so that the boss 2 is formed. Since the boss 2 is formed by the conventional semiconductor process like this, the boss 2 can be formed with a machining accuracy of submicron order. Therefore, the positioning deviation between the boss 2 and the gauge resistor 5 becomes much smaller.

Then, a metallic film is formed on the surface of the substrate 4, and then, the metallic film is patterned so that the electrodes 7, 8 are formed. Further, the backside electrode 10 is formed on the bottom of the silicon substrate 4. Thus, elements for providing the sensor chip 1 are formed. After that, the silicon substrate 4 provided by the wafer is divided into multiple chips so that the sensor chip 1 is completed.

Next, as shown in FIG. 7A, the first to third cylindrical members 16a–16c are inserted into the cylindrical member 11 in turn. Then, the support member 14 connected with the electric wire 15 is inserted into the first to third cylindrical members 16a–16c. At this time, the top of the support member 14 is set to be near the top end of the cylindrical member 11. This process is performed by a jig (not shown).

As shown in FIG. 7B, when the sensor chip 1 is accommodated in the sensor chip accommodation portion 20b of the positioning member 12, the positioning member 12 with the sensor chip 1 is inserted into the cylindrical member 15. At this time, the support member 14 is set to be disposed near the top of the cylindrical member 11. Therefore, the sensor chip 1 does not drop out from the positioning member 12 so that the sensor chip 1 is mounted on the support member 14. Accordingly, the sensor chip 1 is disposed at the center axis of the cylindrical member 15.

Figure 8:
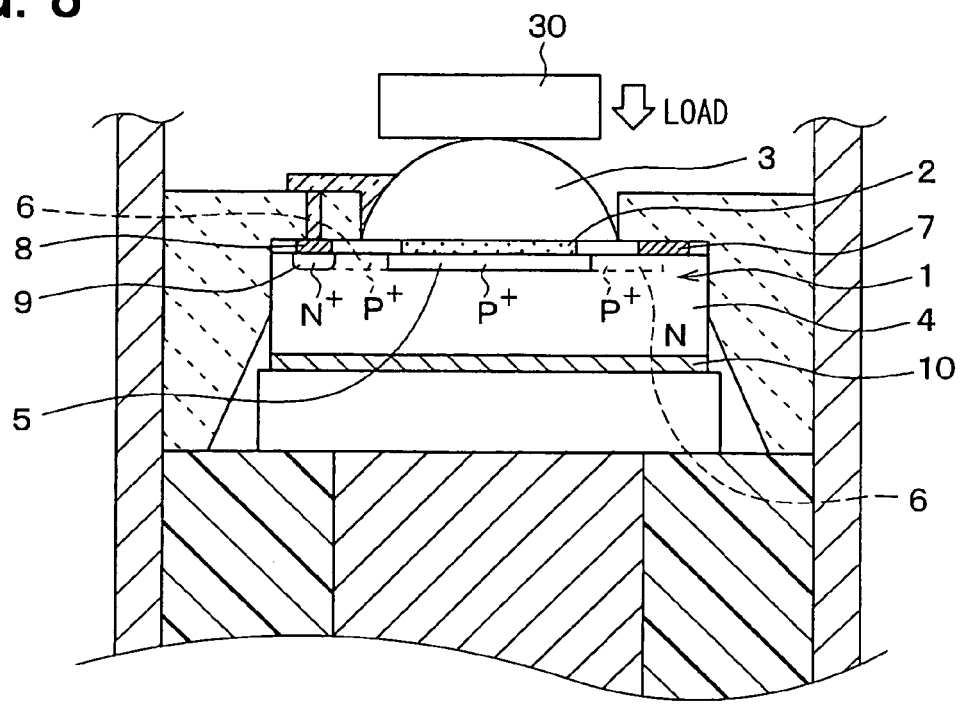
FIG. 8 is a partially enlarged cross sectional view explaining a positioning method of the sensor chip in the pressure sensor according to the preferred embodiment.

Here, if the hemispherical member 3 and the sensor chip 1 are a little shifted from the center axis, the sensitivity of the sensor is reduced. In this case, the sensor chip 1 and the hemispherical member 3 can be positioned with monitoring the sensitivity, i.e., the output of the sensor chip 1. This positioning process of the sensor chip 1 and the hemispherical member 3 is shown in FIG. 8. A positioning jig such as a rod 30 is prepared. A gold plating film is formed on the surface of the rod 30. Then, a predetermined load is applied to the hemispherical member 3 through the rod 30. At the same time, a predetermined voltage is applied to the sensor chip 1 through the electric wire 15 so that the current flows between the electrical wire 15 and the rod 30. With monitoring the current to be a desirable value, the sensor chip 1 and the hemispherical member 3 are positioned.

Next, as shown in FIG. 7C, the hemispherical member 3 is mounted in the hemispherical member accommodation portion 20a of the positioning member 12. Here, the diameter of the hemispherical member 3 is equal to the dimension of one of the sides of the hemispherical member accommodation portion 20a. Therefore, the hemispherical member 3 is positioned easily. Then, the conductive adhesive 14 is applied on to fill the through hole 21 of the positioning member 12 so that the electrode 8 of the sensor chip 1 and the hemispherical surface of the hemispherical member 3 are electrically connected.

Next, the sensor chip 1, the positioning member 12, the support member 14, and the first to third cylindrical members 16a–16c are slid inside the cylindrical member 11 so that the hemispherical member 3 is drawn into the cylindrical member 3. Then, the metallic diaphragm 17 with the load transmission member 18 connected thereto is prepared. The top of the cylindrical member 11 is engaged into the opening of the diaphragm 17, and then, the outer circumference of the diaphragm 17 is welded so that the diaphragm 17 is bonded to the cylindrical member 11.

As shown in FIG. 7D, the sensor chip 1, the positioning member 12, the support member 14, and the first to third cylindrical members 16a–16c are slid again inside the cylindrical member 11 so that the top of the hemispherical member 3 contacts the load transmission member 18. Then, the second cylindrical member 16b is welded and bonded to the cylindrical member 11. The welding is performed from the outside of the cylindrical member 11 at a position of the second cylindrical member 16b. Thus, the pressure sensor is completed.

(Modifications)

Figure 9:
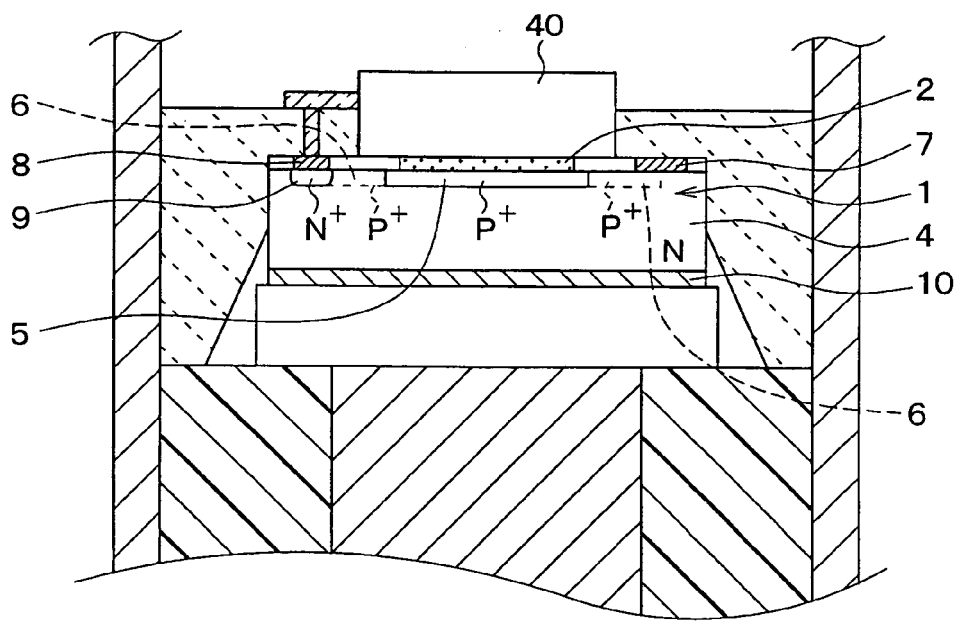
FIG. 9 is a partially enlarged cross sectional view showing a main part of a pressure sensor according to a modification of the preferred embodiment.
Figure 10:
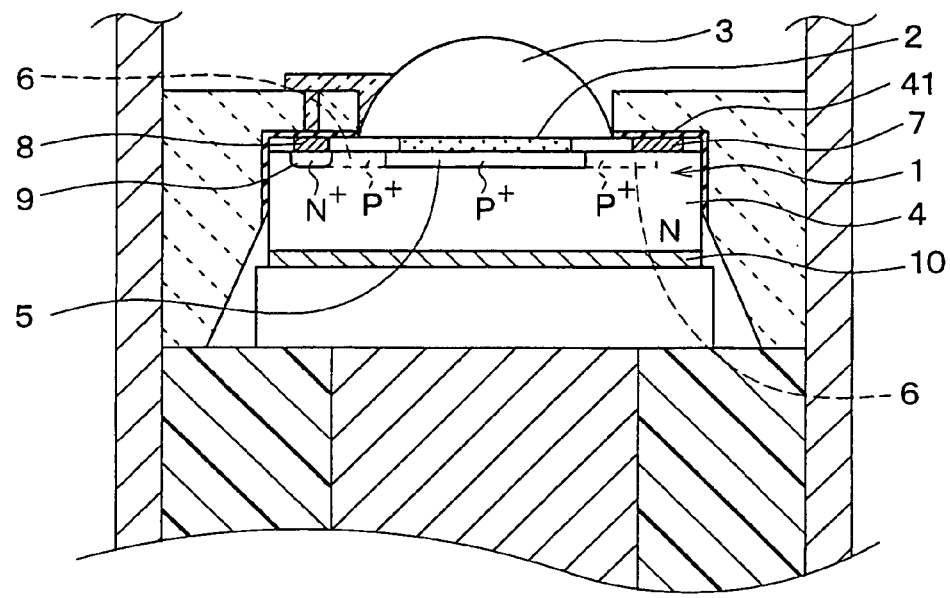
FIG. 10 is a partially enlarged cross sectional view showing a main part of a pressure sensor according to another modification of the preferred embodiment.

Although the hemispherical member 3 is used as a load application member for applying the load to the boss 2, other load application members can be used for applying the load to the boss 2. For example, as shown in FIG. 9, a cylindrical columnar member 40 can be used as the load application member.

Although the sensor chip 1 is merely accommodated in the sensor chip accommodation portion 20b of the positioning member 12 when the sensor chip 1 is assembled, an adhesive 41 can be applied partially or wholly on a contact portion between the sensor chip 1 and the positioning member 12 so that the sensor chip 1 is bonded to the positioning member 12. Thus, when the sensor chip 1 is assembled, the sensor chip 1 is protected from dropping out from the positioning member 12.

Although the support member 14 is supported by the first to third cylindrical members 16a–16c, the support member 14 can be positioned and supported by a glass hermetic seal.

Although the electrical wire 15 is inserted into the cylindrical member 11, the total length of the support member 14 can become longer so that the electrical wire 15 is connected at an outside portion or near the outside of the cylindrical member 11. In this case, the support member 14 can be supported with the glass hermetic seal instead of the first to third cylindrical member.

Such changes and modifications are to be understood as being within the scope of the present invention as defined by the appended claims.

What is claimed is:

1. A pressure sensor comprising:

a casing having an inner through hole with an opening;

a sensor chip with a gauge resistor disposed on a surface of the sensor chip;

a boss disposed on the gauge resistor;

a metallic diaphragm capable of distorting in accordance with a pressure; and a load transmission member disposed between the metallic diaphragm and the boss and being movable in accordance with a distortion of the metallic diaphragm so that a load corresponding to the pressure applied to the metallic diaphragm is transmitted to the boss through the load transmission member, wherein the casing accommodates the sensor chip, the boss and the load transmission member inside the inner through hole of the casing, the opening of the casing is covered with the metallic diaphragm, the pressure applied to the diaphragm is detected in such a manner that the load corresponding to the pressure is applied to the gauge resistor through the metallic diaphragm, the load transmission member and the boss so that a resistance of the gauge resistor is changed, and that the pressure is measured on the basis of a resistance change of the gauge resistor, and the gauge resistor is larger than the boss, seeing from a load transmission member side, so that the boss is covered with the gauge resistor.

2. The pressure sensor according to claim 1, further comprising:
a positioning member disposed inside the casing, wherein
the positioning member has a diameter almost equal to an inner diameter of the casing,
the positioning member includes a sensor chip accommodation portion, and
the sensor chip is disposed in the sensor chip accommodation portion of the positioning member.

3. The pressure sensor according to claim 1, wherein
the boss has a circular cross section perpendicular to a center axis of the casing,
the gauge resistor has a square cross section perpendicular to the center axis of the casing, and
the boss has a diameter equal to or slightly smaller than a dimension of a side of the gauge resistor.

4. The pressure sensor according to claim 1, further comprising:
a load application member disposed between the load transmission member and the boss for transmitting the load from the load transmission member to the boss.

5. A pressure sensor comprising:
a cylindrical member;
a sensor chip with a gauge resistor disposed inside the cylindrical member;
a boss disposed on the gauge resistor and disposed inside the cylindrical member;
a metallic diaphragm capable of distorting in accordance with a pressure; and
a load transmission member disposed between the metallic diaphragm and the boss so that the diaphragm is disposed on the sensor chip through the load transmission member and the boss, and being movable in accordance with a distortion of the metallic diaphragm so that a load corresponding to the pressure applied to the metallic diaphragm is transmitted to the boss through the load transmission member, wherein
the pressure applied to the diaphragm is detected in such a manner that the load corresponding to the pressure is applied to the gauge resistor so that a resistance of the gauge resistor is changed, and that the pressure is measured on the basis of a resistance change of the gauge resistor, and
the gauge resistor has a cross section larger than that of the boss, the cross section perpendicular to a center axis of the cylindrical member.

6. The pressure sensor according to claim 5, wherein the boss is covered with the gauge resistor, seeing the gauge resistor and the boss from a load transmission member side.

7. The pressure sensor according to claim 5, further comprising:
a positioning member disposed inside the cylindrical member, wherein
the positioning member has a diameter almost equal to an inner diameter of the cylindrical member,
the positioning member includes a sensor chip accommodation portion, and
the sensor chip is disposed in the sensor chip accommodation portion of the positioning member.

8. The pressure sensor according to claim 5, wherein
the boss has a circular cross section perpendicular to the center axis of the cylindrical member,
the gauge resistor has a square cross section perpendicular to the center axis of the cylindrical member, and
the boss has a diameter equal to or slightly smaller than a dimension of a side of the gauge resistor.

9. The pressure sensor according to claim 5, further comprising:
a load application member disposed between the load transmission member and the boss for transmitting the load from the load transmission member to the boss.

* * * * *